United States Patent

Anokhin et al.

[11] Patent Number: 5,344,281
[45] Date of Patent: Sep. 6, 1994

[54] ROTARY VORTEX MACHINE

[75] Inventors: Vladimir D. Anokhin, Moscow; Anatoly I. Lepekha, Lobnya; Viktor N. Filippov; Sharifzhan R. Ageev, both of Moscow; Anatoly F. Vinokurov, Fryazino; Jury V. Gusev, Kaliningrad; Sergei J. Ermakov, Schelkovo, all of Russian Federation

[73] Assignee: Osoboe Konstruktorskoe Bjuro Po Konstruirovaniju, Issledovaniju I Vnedreniju Glubinnykh Besshtangovykh Nasosov, Moscow, Russian Federation

[21] Appl. No.: 949,642

[22] PCT Filed: Apr. 3, 1990

[86] PCT No.: PCT/SU90/00080

§ 371 Date: Dec. 2, 1992

§ 102(e) Date: Dec. 2, 1992

[87] PCT Pub. No.: WO91/15680

PCT Pub. Date: Oct. 17, 1991

[51] Int. Cl.[5] .............................. F04D 29/28
[52] U.S. Cl. .................... 415/71; 415/170.1; 415/174.2; 415/198.1; 415/204; 415/206; 415/208.3; 416/177

[58] Field of Search ............ 415/71, 170.1, 174.2, 415/174.3, 198.1, 204, 206, 207, 208.3; 416/176, 177

[56] References Cited

U.S. PATENT DOCUMENTS 748,294 12/1903 MacKenzie ................ 415/170.1

FOREIGN PATENT DOCUMENTS

2405795 1/1975 Fed. Rep. of Germany ...... 415/206
3536140 4/1987 Fed. Rep. of Germany ... 415/174.3
1566059 5/1990 U.S.S.R. .......................... 415/71

Primary Examiner—Edward K. Look
Assistant Examiner—Christopher Verdier
Attorney, Agent, or Firm—Ladas & Parry

[57] ABSTRACT

A rotary vortex machine having a stator (1) with an internal annular space (4) accommodating vanes (9) and a rotor (6) with an external annular space (7) accommodating a bridge (10) dividing the external annular space (7) into suction and delivery volumes. The rotor (6) has a curvilinear inlet passage (11) and a curvilinear outlet passage (12) to provide a flow of a service fluid essentially in one and the same direction in the suction and delivery volumes of the external annular space (7).

5 Claims, 6 Drawing Sheets

ROTARY VORTEX MACHINE

FIELD OF THE INVENTION

The present invention relates to constant displacement hydraulic machines and, more particularly, to a rotary vortex machine that can be used in the capacity of a pump, compressor or motor.

PRIOR ART

Widely known in the prior art are rotary machines used as pumps or motors having a stator with an internal working space and inlet and outlet ports, and a rotor capable of rotating and having a bypass passage with inlet and outlet ports.

However, the provision of friction pairs (plates-to-stator slots and plates-to-rotor pairs) in rotary machine reduces reliability of its design, its economy and specific speed.

Besides, such a design involves inevitable pulsations of service fluid in working chambers which may bring about breakdowns of the machine, all the more so at high pressures of the operating fluid.

Also known in the prior art is a rotary machine (SU, A, 735808) used as a pump and comprising a stator with an internal annular chamber with vanes, inlet and outlet ports for service fluid, and a stage for conversion of service fluid energy mounted in the stator on the driving shaft, said stage having the form of a rotor provided with an external annular chamber mating with the annular chamber of the stator and forming, together with it, a working annular chamber and a bridge accommodated in the annular chamber of the rotor and dividing it into suction and delivery volumes connected with the inlet and outlet passages of the stator by axial holes and bypass passages arranged parallel with a radial plane passing through the bridge.

However, in this type of communication of the suction and delivery volumes of the annular chamber with the inlet and outlet passages of the stator, the operating fluid in the zone of the bridge moves in opposite directions. The fluid flow is accompanied by high energy losses since the fluid flow from the stator inlet port to the suction volume of the working annular chamber turns many times through a considerable angle, passing from the axial holes into the bypass passages and thence, through other holes, into the annular chamber of the rotor.

Similar processes also occur at the rotor outlet.

It should be also noted that such a design of holes for admission and discharge of the operating fluid fails to shape said holes in a rational way from the viewpoint of hydrodynamics. Besides, the delivery and suction volumes in the rotor are spaced apart at a considerable distance because the axial ports are separated by a bridge arranged parallel with the radial plane which reduces the length of the operating chamber and, consequently, diminishes the region of effective vortex (circulating) interaction between the fluid flow and the vanes which, in turn, increases the back flow of the operating fluid and decreases efficiency.

SUMMARY OF THE INVENTION

The basic object of the present invention is to provide a rotary vortex machine wherein communication of the rotor annular chamber with the inlet and outlet passages of the stator will bring the losses of energy of the operating fluid to a minimum during admission and discharge from the rotor which, in turn, will increase the degree of conversion of energy of the service fluid in the rotary machine, increase its efficiency and reduce its dimensions.

This object is attained in the rotary vortex machine comprising a stator accommodating an internal annular chamber with vanes, inlet and outlet passages for the operating fluid, and a stage for converting the energy of the operating fluid installed in the stator on the driving shaft, said stage being in the form of a rotor having an external annular space combined with the annular space of the stator and forming, together therewith a working annular chamber and a bridge arranged in the annular space of the rotor and dividing it into suction and delivery volumes connected with the inlet and outlet passages of the stator wherein, according to the invention, the rotor is provided with curvilinear inlet and outlet passages connecting the suction and delivery volumes of the annular rotor space with the inlet and outlet passages of the stator and disposed on both sides of the bridge so that the flows of the operating fluid pass through these curvilinear passages, essentially, in one and the same direction, the bridge on the section of these curvilinear passages having a variable cross section and being set at an angle relative to the radial plane of the rotor passing through said bridge.

In this design of the rotary machine the flows of the service fluid in curvilinear inlet and outlet passages are unidirectional and turning of the fluid flow therein is minimum. This reduces considerably the energy losses of the service fluid.

Owing to the curvilinear shape of the passages, the flow of service fluid therein approaches that in the working passages of turbine-driven machines so that energy of the fluid can be additionally converted directly in these passages, thereby raising the total efficiency of the rotary machine. Besides, the arrangement of the bridge at an angle relative to the radial surface of the rotor has permitted making curvilinear passages along said surface which has reduced substantially the relative area occupied by said passages in the rotor, thereby providing for maximum utilization of the length of the annular rotor space for converting the energy due to vortex (circulating) flow of fluid. This reduces the back flow of the fluid, increases the efficiency of the rotary machine and reduces its overall dimensions.

It is practicable for the rotary machine to be provided with at least one additional stage for converting the energy of the service fluid, arranged so that its curvilinear inlet passage communicates with the curvilinear outlet passage of the preceding stage, and that the stage rotors are mounted on the drive shaft with provision for axial motion and be installed on supporting end seals positioned between the stator and rotor at the side of the curvilinear inlet passage.

Such a design ensures stability of efficiency, head and operational reliability of the rotary machine due to transmission of the axial force acting on each rotor to the individual support of each stage.

If the annular spaces of the stator and rotor are formed in their end faces, it is practicable that the curvilinear inlet and outlet passages of the rotor to be of a spiral-shaped form and the outlet passage of the stator to be in the form of a volute-shaped diffuser with the winding direction opposite that of the curvilinear passages of the rotor.

In this case the inlet passage of the stator may be arranged along the rotor axis.

The spiral shape of the rotor passages and of the stator outlet passage reduces the hydraulic losses caused by the flow from one element of the flow duct to another and by turns of the flow and by ensuring losses. This leads to higher efficiency while the provision of a diffuser on the periphery of the rotary machine and axial inlet of the service fluid reduces axial dimensions of the rotary machine.

BRIEF DESCRIPTION OF THE DRAWINGS

Now the invention will be described in detail in relation to embodiments of a rotary pump with reference to the appended drawings wherein.

BEST DETAILED DESCRIPTION OF MODES OF CARRYING OUT THE INVENTION

A rotary machine used as, say, a fluid pump comprises a stationary casing serving as a stator 1 (FIG. 1) with an inlet passage 2 and an outlet passage 3 and an internal annular space 4, and a fluid energy conversion stage installed in the stator 1 on a drive shaft 5, and having the form of a rotor 6. The external side surface of the rotor 6 has an internal annular space 7 combined with the annular space 4 of the stator and forming a working annular chamber 8 therewith. The annular space 4 (FIG. 2) of the stator 1 accommodates stationary vanes 9 which form a plurality of individual sections in the working chamber 8.

The annular space 7 of the rotor 6 contains a bridge 10 separating it into a suction volume 7a and a delivery volume 7b. The suction volume 7a is in communication with the inlet passage 2 (FIG. 1) by a curvilinear inlet passage 11 while the delivery volume 7b is in communication with the outlet passage 3 through a curvilinear outlet passage 12.

Figure 1:
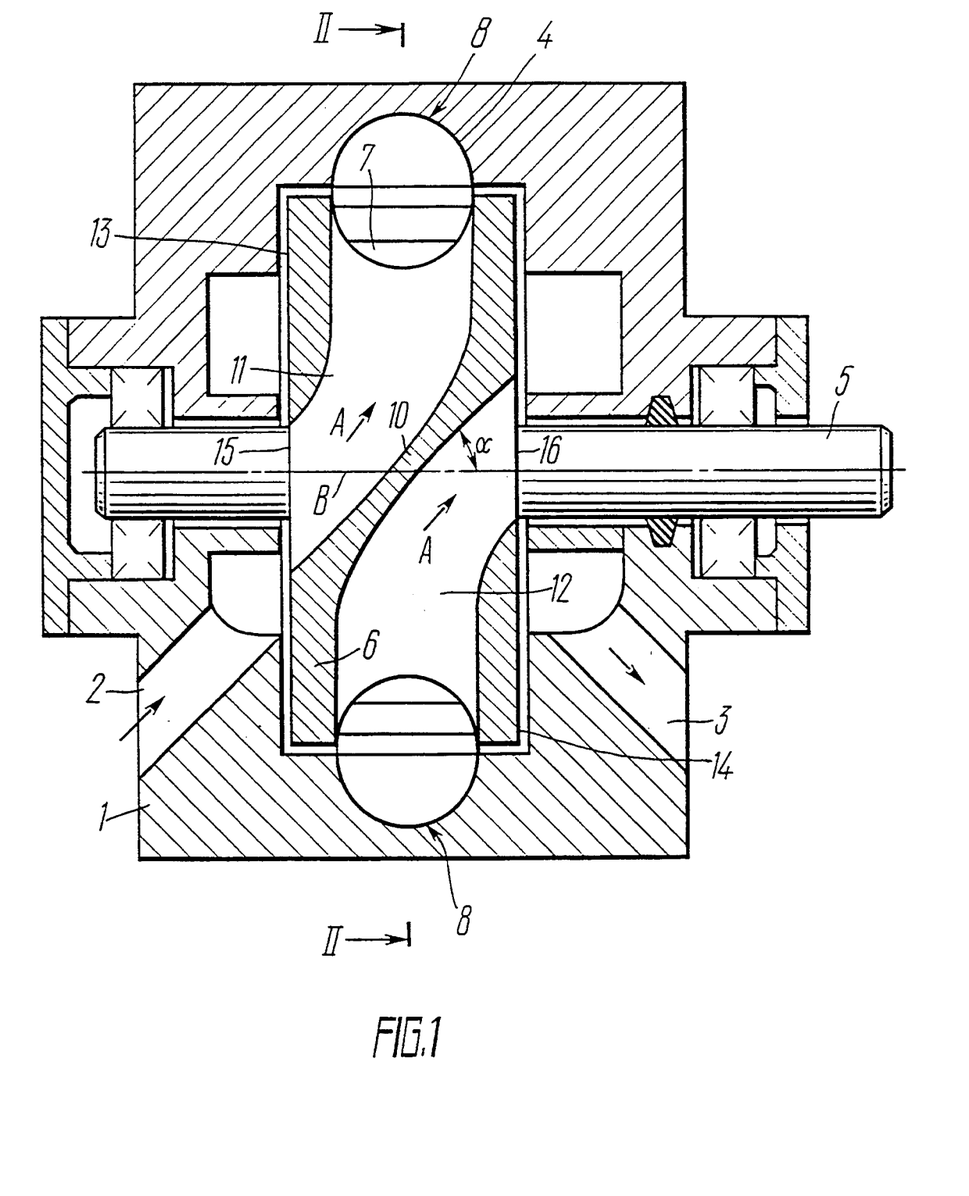
FIG. 1 is a longitudinal section through the rotary pump.
Figure 3:
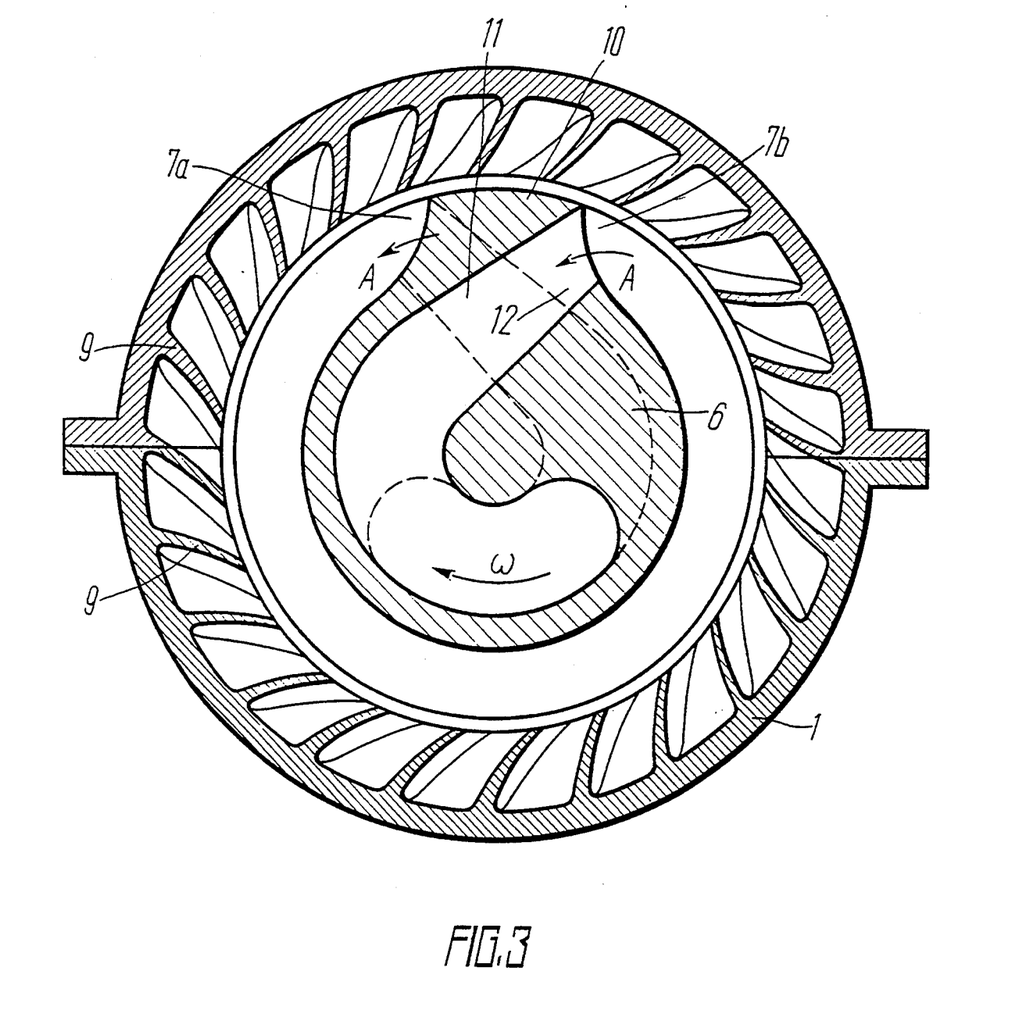
FIG. 3 is a cross section of the rotary pump with curvilinear passages in the rotor.

The curvilinear passages 11 and 12 (FIGS. 1, 3) are arranged on both sides of the bridge 10 and their holes 15, 16 opening onto the opposite end faces 13, 14 of the rotor 6 are located opposite to each other as shown in FIG. 1, or they may be offset from each other depending on the particular field of pump utilization.

Figure 2:
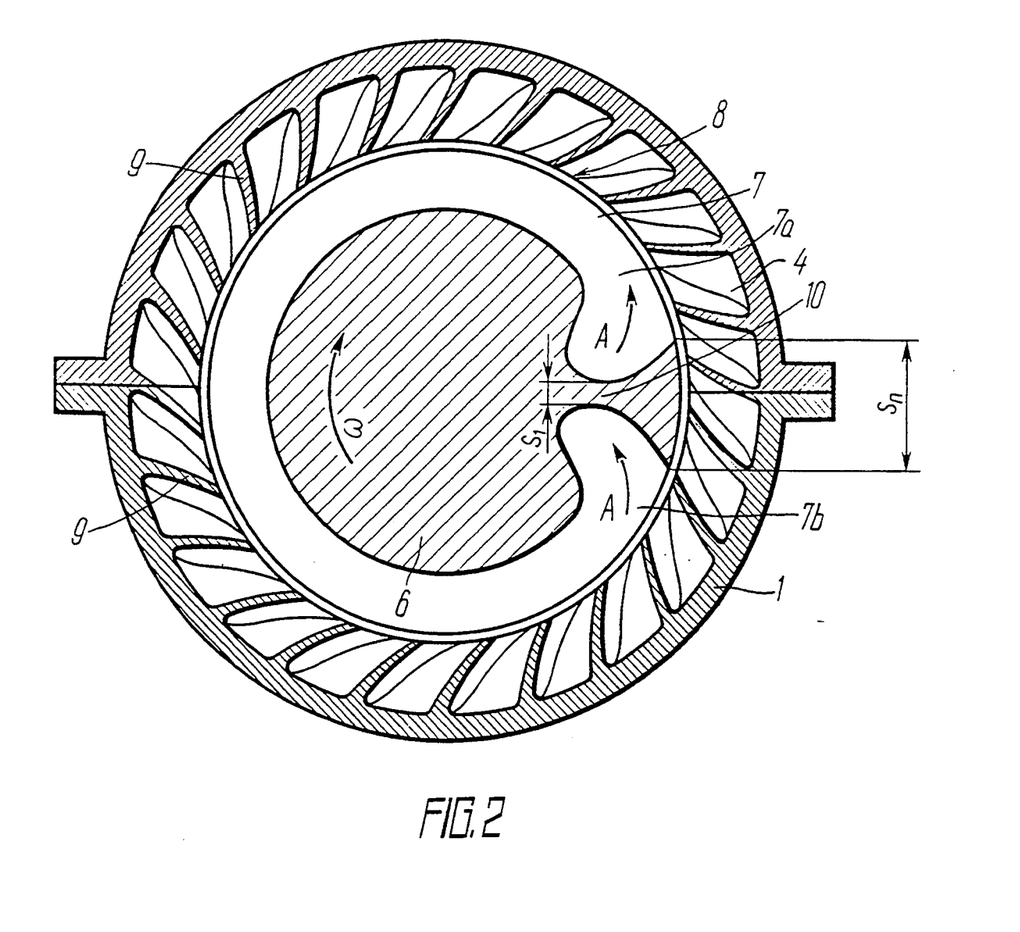
FIG. 2 is a section taken along line II—II in FIG. 1.

Owing to such an arrangement of the curvilinear passages 11 and 12, the flows of service fluid pass through them in one direction shown by arrows A at an angle relative to the direction of rotor rotation, and in the opposite direction. The bridge 10 (FIGS. 1 through 7) in the zones of the curvilinear passages 11 and 12 has a varying cross section from $S_1$ to $S_n$ as shown in FIG. 2 and is set at an angle $\alpha$ to the plane B passing through the bridge as shown in FIGS. 1, 6.

The disclosed rotary machine used as a pump may be of a multistage construction.

Such a pump is used as a submersible machine for lifting liquids from wells in which case it also has one or more additional stages 17 (FIG. 4) similar to the above-described fluid energy conversion stage. Such stages 17 are installed so that the curvilinear inlet passage 18 in each subsequent stage communicates with the curvilinear outlet passage 12 of the preceding stage. The rotors 6 and 19 of the stages 17 are mounted on the drive shaft 5 with provision for axial movement, i.e. they are of the floating type, which is ensured by the provision of slotted gaps 20 between the rotors and of the circular gaps 21 between the stators and rotors of the stages. Each of the rotors 6 and 19 of the stages 17 is installed on supporting end seals 22 located between the stator and rotor at the side of the curvilinear inlet passages 11 and 18. Each supporting end seal 22 comprises a ring 23 made of a known antifriction wear-resistant material and disposed in an annular groove 24 on the stator or in an insert 25 between the stators 1, and a circular projection 26 located on the rotors 6 and 19 at the side of the curvilinear inlet passages 11, 18 and resting on the ring 23.

The rotary pump shown in FIGS. 1, 2 functions as follows.

During rotation of the rotor 6 the service fluid flows from the inlet passage 2 into the curvilinear inlet passage 11 and is thrown by the centrifugal force to the periphery through this passage into the working annular chamber 8 formed by the annular space 7 of the rotor 6 and the annular space 4 of the stator 1. The trajectory of the fluid in the working chamber 8 is of a spiral circulating nature due to the curvature of walls of the annular spaces 4 and 7 of the stator 1 and rotor 6, respectively, and the inclination of the surfaces of the vanes 9. As the service fluid moves in the annular space 7 of the rotor 6 it is acted upon by relatively large centrifugal forces proportional to $$\frac{QV_u^2}{R}$$

where
Q—density of the fluid,
R—radius of curvature,
$V_u$—peripheral speed component of the elementary fluid particle. Under the effect of this centrifugal force the fluid particles get into the intervane sections where the fluid practically loses the peripheral component of speed and the centrifugal force acting on each particle in these intervane sections is insignificant. Under the effect of the difference between the centrifugal force acting on the fluid flowing from the circular chamber of the rotor and on the fluid in the intervane space of the stator, portion of the fluid is forced from the intervane section by a new portion flowing from the annular space 7 of the rotor 6 and, after repreated interaction with the vanes 9, moves into the curvilinear passage 12 wherefrom it is delivered by centripetal force into the outlet passage 3.

A combination of the curvilinear surfaces of the annular spaces of the rotor, stator and vanes resists efficiently back flow of the fluid which, acquiring additional energy as in vortex pumps and using the centrifugal and centripetal forces of rotor rotation results in increase of the pump head.

In this design of the rotary machine there are no structural limitations for shaping the curvilinear form of the inlet 11 and outlet 12 passages in accordance with the hydrodynamics of the passages of turbine-driven machines wherein the energy of the service fluid can be additionally converted at minimum losses.

Figure 4:
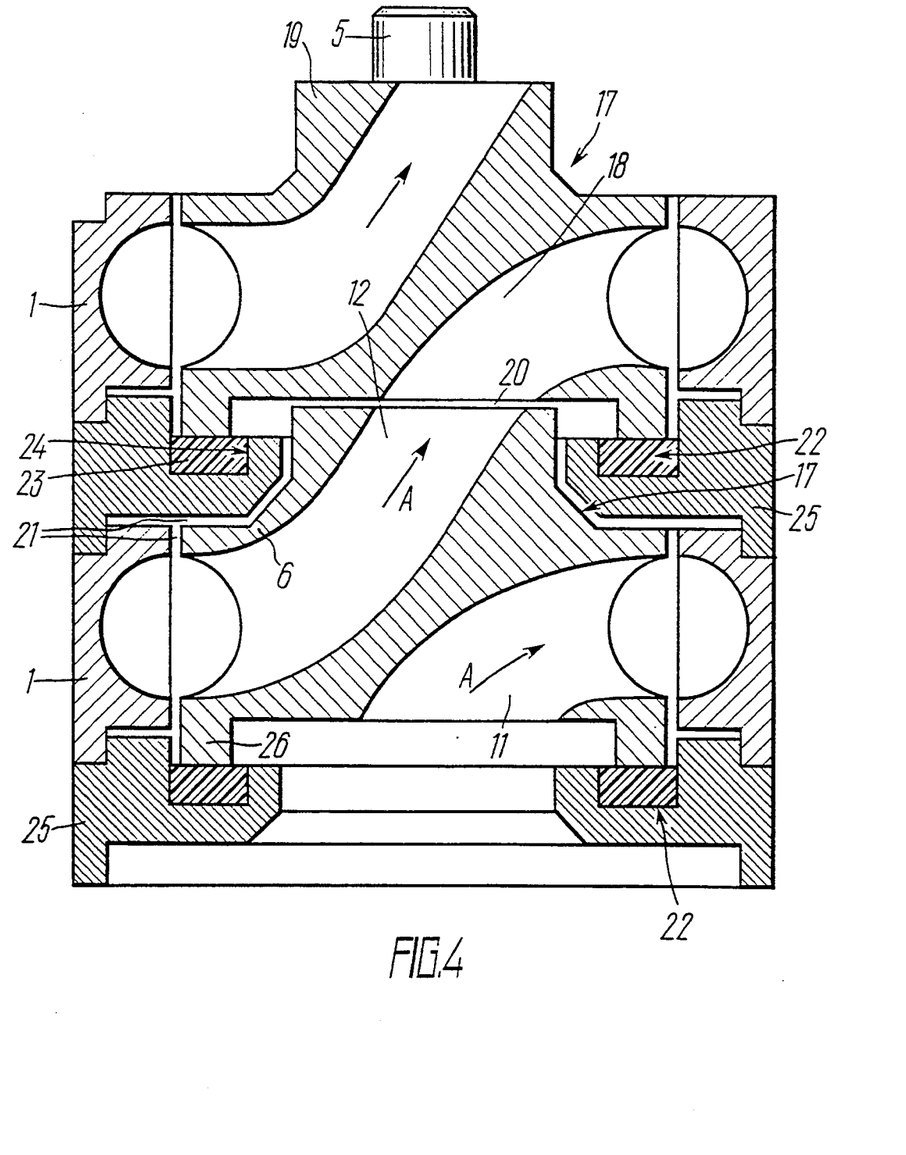
FIG. 4 is a longitudinal section of the rotary pump with two energy-converting stages and supporting end seals.

The rotary pump comprising several stages 17 as shown in FIG. 4 functions as follows.

The drive shaft 5 carrying rotors 6 and 19 of the sections 17 is set in rotation. The service fluid moves in the working circular chamber 8 of each stage just as described hereinabove for the rotary pump illustrated in FIGS. 1-3.

After the service fluid has acquired additional energy, this fluid is delivered under pressure through the curvilinear outlet passage 12 of one section into the curvilinear inlet passage 18 of the subsequent stage 17 and thence, into the working annular chamber of this section.

As a result, the service fluid moves in succession through all pump sections and develops a higher head at the outlet.

The difference of pressures in the curvilinear passages 11 and 12 between the working chamber in each stage 17 and the low-pressure hole of the rotor separated from each other by the slotted gap 20 produces an axial force acting on the rotor.

Inasmuch as the total pressure differential built up by the multistage pump is large, the load on the thrust bearing may reach an impermissible level. Besides, operation of the multistage pump is influenced adversely by stage-to-stage leaks through the gaps 20, 21. Owing to the floating construction of each rotor of the stage (rotor freely moving along the shaft) in which each rotor rests on end seals 22, this eliminates stage-to-stage leaks and reduces radically the load on the bearings.

Besides, the end seals of each stage can take the axial load acting on the stage rotor without providing the machine with a sophisticated assembly for resisting the axial load of the rotor, said assembly reducing the reliability of the machine considerably, all the more so for small diametral dimensions as, for example, in a submersible well pump.

Thus, provision of each stage of the rotary machine with supporting end seals ensures stable parameters of efficiency, head and reliability of the rotary machine.

Figure 5:
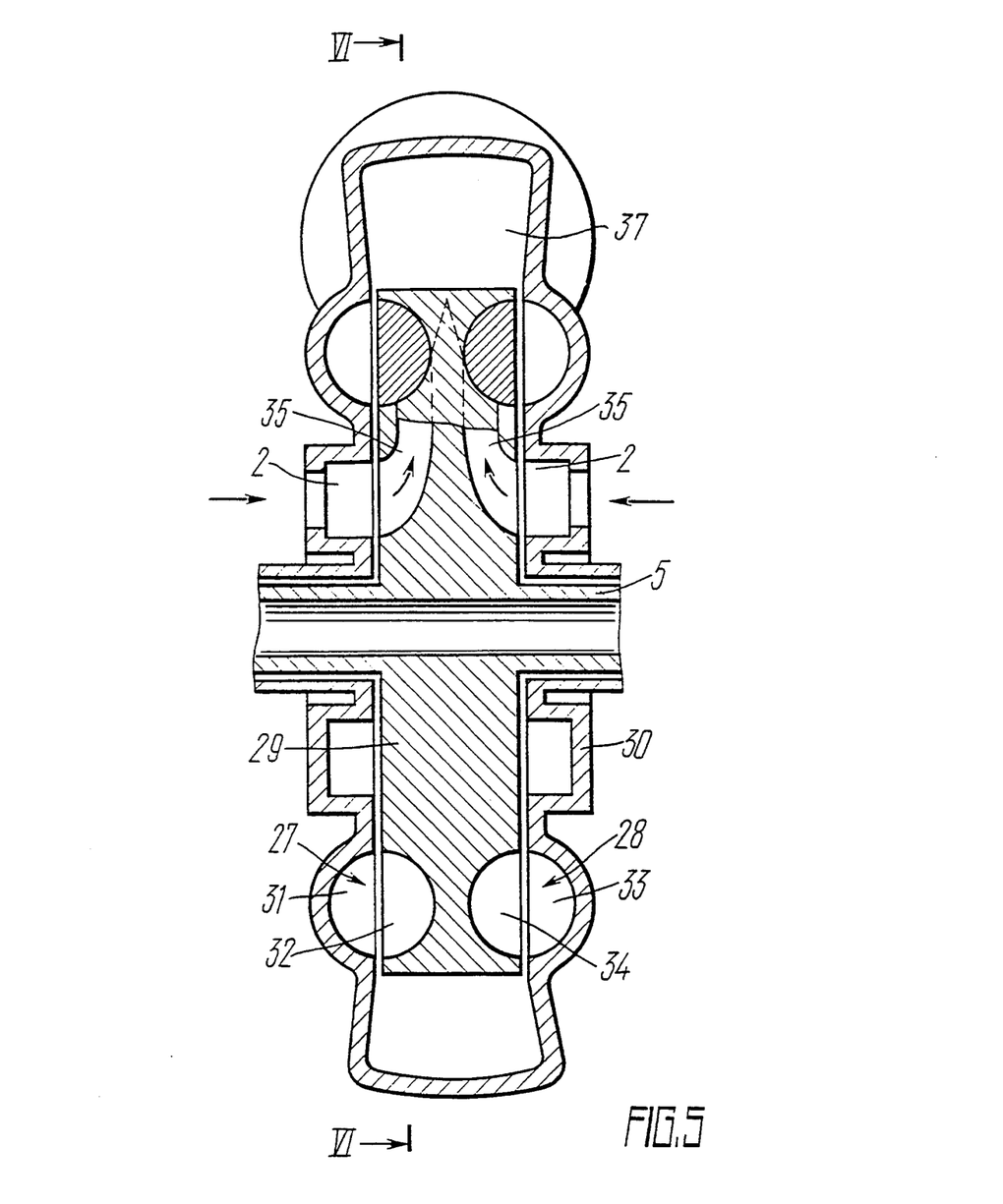
FIG. 5 is a longitudinal section of the rotary pump with annular working chambers on end faces of the rotor.
Figure 6:
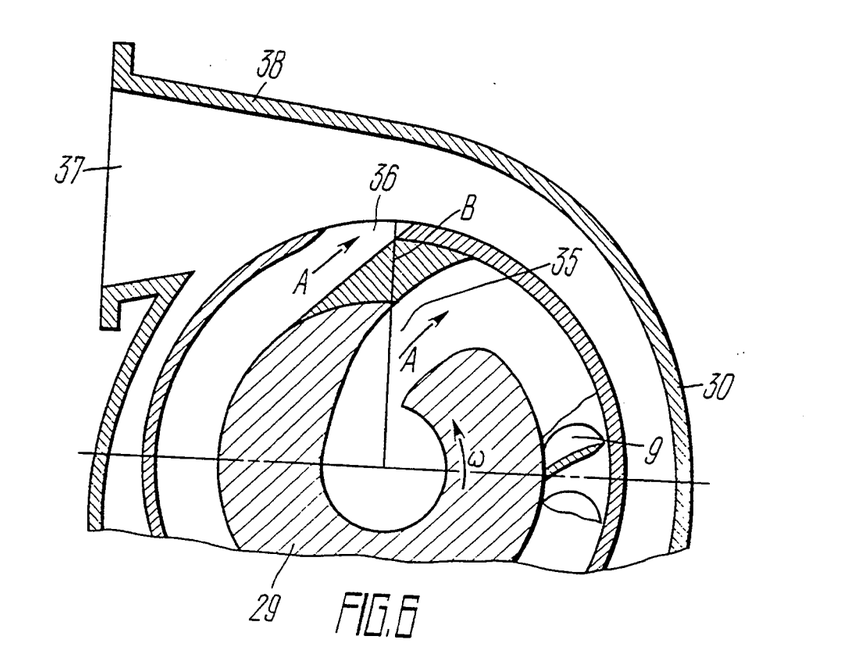
FIG. 6 is a partial cross section taken along line VI—VI in FIG. 5.

Shown in FIG. 5 is an embodiment of the pump with two working chambers 27 and 28 disposed on the end face surfaces of the rotor 29 and stator 30. The working chamber 27 is constituted by annular spaces 31 and 32 in the stator 30 and rotor 29, respectively, while the working chamber 28 is constituted by annular spaces 33 and 34 in the stator 30 and rotor 29.

The curvilinear inlet passages 35 and curvilinear outlet passages 36 in the rotor 29 are of a spiral shape as shown in FIG. 6 while the outlet passage 37 of the stator has the form of a volute-shaped diffuser 38 with its direction of winding opposite that of the curvilinear passages 35 and 36 of the rotor 29.

Figure 7:
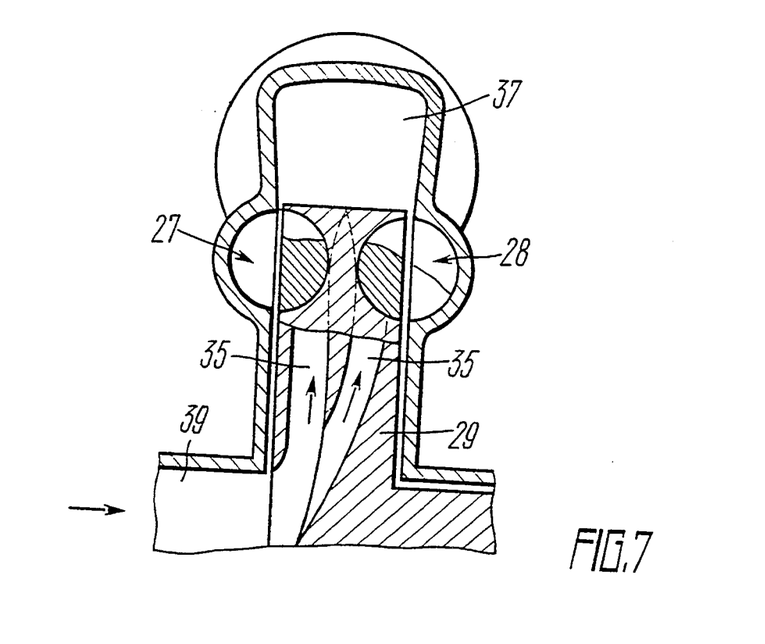
FIG. 7 is a partial longitudinal section through the rotary pump with axial fluid inlet.

In the embodiment shown in FIG. 7 the inlet passage 39 for service fluid is arranged along the axis of the rotor 29, said rotor being cantilevered on the drive shaft 5, and its curvilinear inlet passages 35 communicate with passage 39 as can be seen in FIG. 7.

In this embodiment of the pump the low-pressure service fluid flows through the inlet passages 2 and curvilinear inlet passages 35 into the annular working chambers 27 and 28 of the pump wherefrom it is discharged through the curvilinear outlet passages 36 into the diffuser 38 and thence to the outlet opening.

The service fluid in the working annular chambers 27 and 28 acquires circulating motion in the above-described manner and offers effective resistance to the back flow of the medium (along rotor rotation).

Due to the arrangement of two opposite-disposed working chambers 27 and 28 there appear symmetrical pressure curves in the rotary machine. Said pressures act on the rotor thus eliminating the forces applied to it and, consequently, improving the working conditions of the bearings and reducing the sagging of the drive shaft which increases the reliability of the rotary machine. Apart from that, the existence of two identical flows increases pump capacity or power in the absence of conditions for development of cavitation of fluid. Thus, the distinctive features mentioned above enhance reliability, capacity and economy of the rotary machine.

Industrial Applicability

The disclosed rotary machine used in the capacity of a pump can be utilized in numerous branches of industry. Used as a motor it drive air-operated tools, operate in air starting systems of I.C. engines and be used as self-contained drives of various mechanisms.

We claim:

1. A rotary vortex machine comprising a stator (1) with an internal annular space (4) accommodating vanes (9), an inlet passage (2) and an outlet passage (3) for a service fluid, and a fluid energy converting stage installed in the stator (1) on a drive shaft (5) and comprising a rotor (6) having an external annular space (7) combined with the annular space (4) of the stator (1) and forming, together with said annular space (4), a working annular chamber (8), and a bridge (10) disposed in the annular space (7) of the rotor (6) and dividing said annular space (7) of the rotor into suction and delivery volumes communicating with the inlet passage (2) and the outlet passage (3) of the stator (1), said rotor (6) having a curvilinear inlet passage (11) and a curvilinear outlet passage (12) which connect the suction and delivery volumes of the annular space (7) of the rotor (6) with the inlet passage (2) and the outlet passage (3) of the stator (1), said curvilinear inlet and outlet passages being arranged on both sides of the bridge (10) in such a manner that the flow of the service fluid moves through said curvilinear passages (11, 12), essentially, in one and the same direction, the bridge (10) in the zone of said curvilinear passages (11, 12) having a variable cross section and being positioned at an angle relative to a radial plane passing through said bridge (10).

2. A rotary machine as claimed in claim 1, further comprising at least one additional stage (17) for conversion of fluid energy installed so that its curvilinear inlet passage (18) communicates with the curvilinear outlet passage (12) of the preceding stage, the rotors (6 and 19) of the stages being mounted on the drive shaft (5) with a provision for axial movement and installed on supporting end seals (22) located between the stators and rotors at the side of the curvilinear inlet passages (11, 18).

3. A rotary machine as claimed in claim 1, wherein end surfaces of said annular spaces (31 and 32) of said stator (30) and said rotor (29) are provided with a spiral-shaped curvilinear inlet passage (35) and a spiral-shaped curvilinear outlet passage (36), said outlet passage (37) of the stator (30) being in the form of a volute-shaped diffuser (38) having a winding direction opposite a winding direction of said curvilinear inlet and outlet passages (35, 36) of the rotor (29).

4. A rotary machine as claimed in claim 1, wherein said inlet passage (38) of the stator (30) is arranged along an axis of rotation of the rotor (29).

5. A rotary machine as claimed in claim 3, wherein said inlet passage (38) of the stator (30) is arranged along an axis of rotation of the rotor (29).

* * * * *